April 24, 1956

G. MANIERRE 2,743,025

CAR UNLOADER

Filed Jan. 14, 1953

INVENTOR.
GEORGE MANIERRE
BY
Wheeler, Wheeler & Wheeler
ATTORNEYS

April 24, 1956  G. MANIERRE  2,743,025
CAR UNLOADER

Filed Jan. 14, 1953  6 Sheets-Sheet 2

INVENTOR.
GEORGE MANIERRE
BY
Wheeler, Wheeler & Wheeler
ATTORNEYS

April 24, 1956 G. MANIERRE 2,743,025
CAR UNLOADER

Filed Jan. 14, 1953 6 Sheets-Sheet 3

INVENTOR.
GEORGE MANIERRE
BY
Wheeler, Wheeler + Wheeler
ATTORNEYS

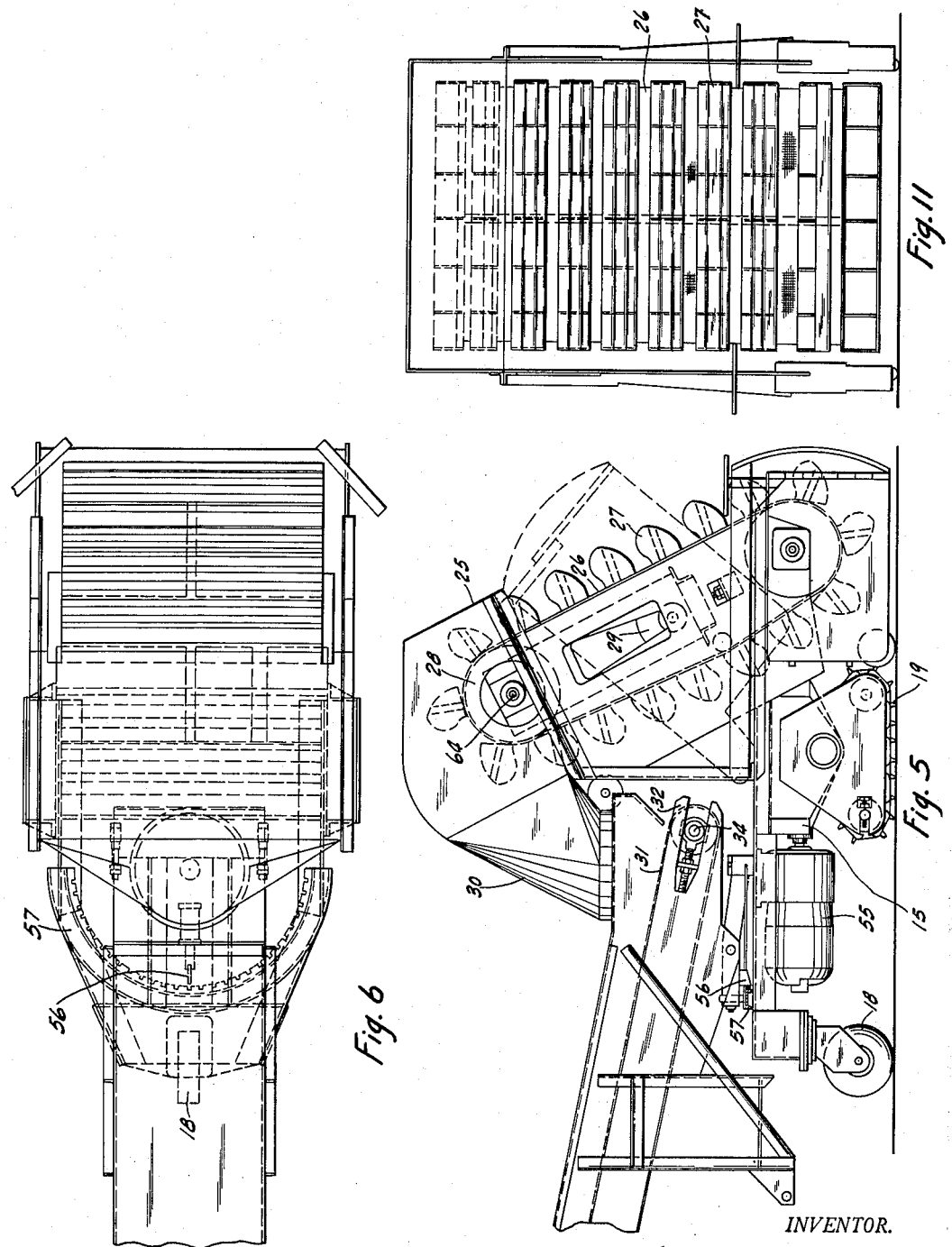

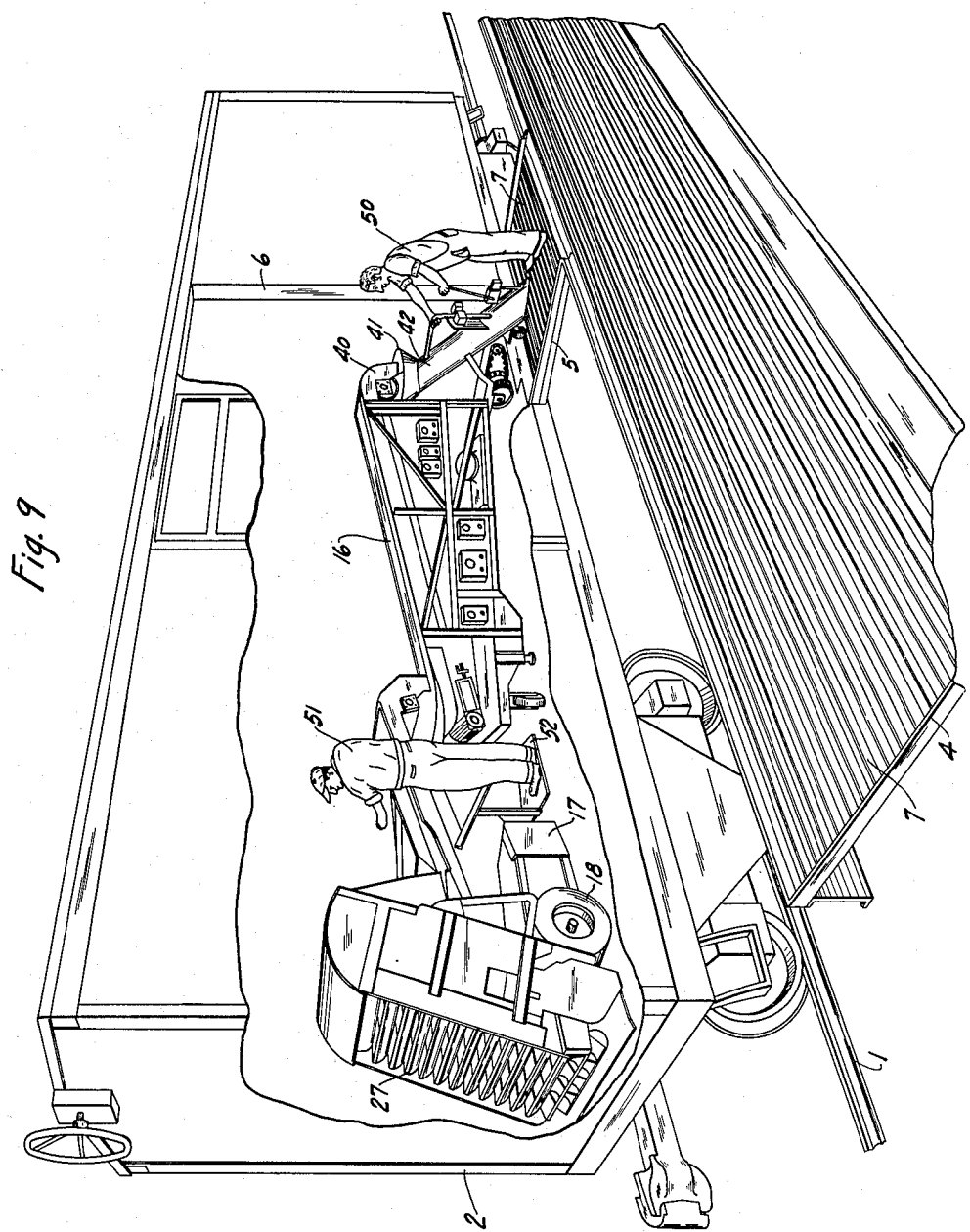

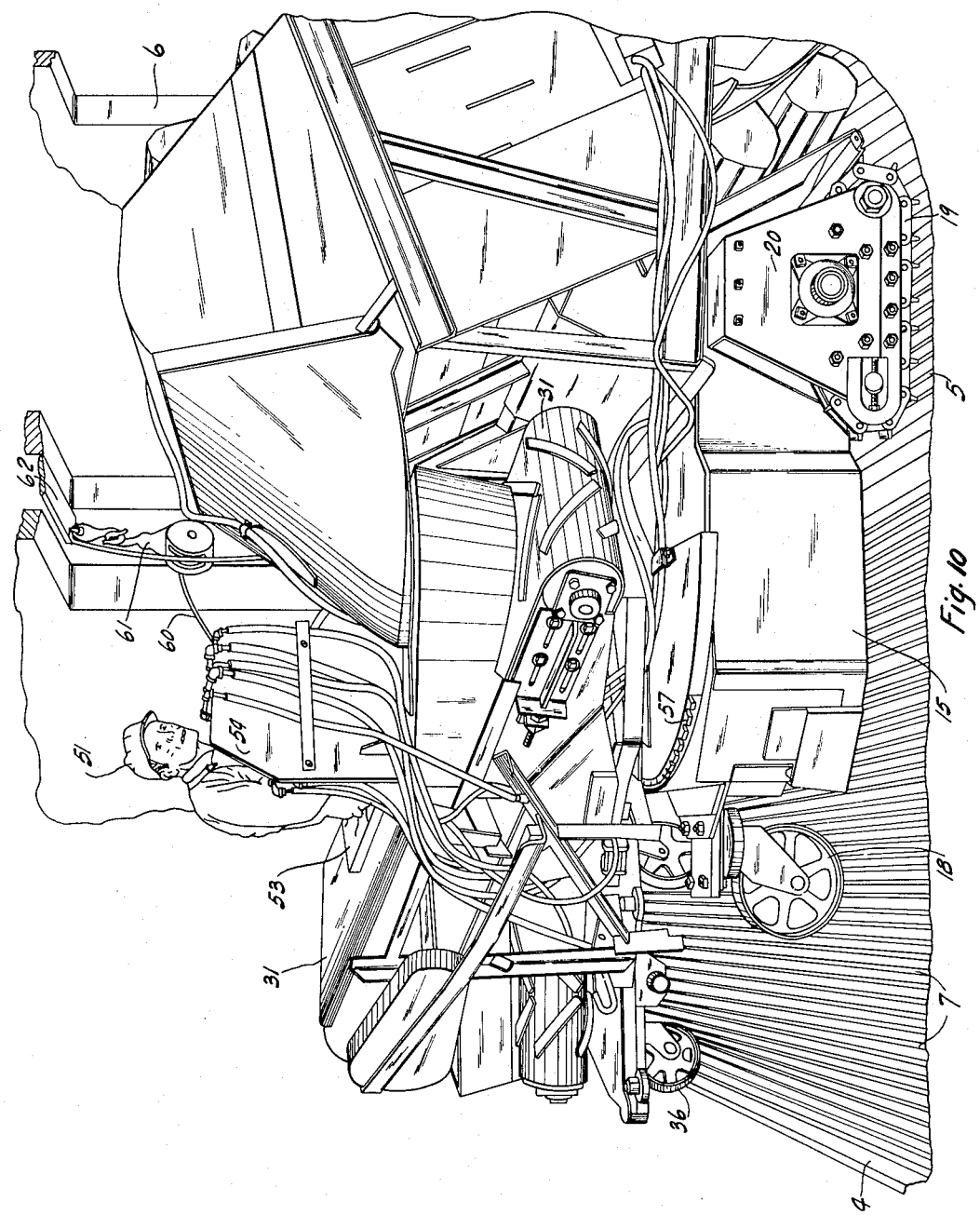

United States Patent Office 2,743,025
Patented Apr. 24, 1956

2,743,025
CAR UNLOADER

George Manierre, Milwaukee, Wis.

Application January 14, 1953, Serial No. 336,107

3 Claims. (Cl. 214—44)

This invention relates to a car unloader.

It contemplates the provision, paralleling the car track, of a platform surfaced with a grating and having a grating extension in registry with a door of a car on the track, there being a receiving hopper in the ground beneath a portion of the grating, and a conveyor operating beneath the grating onto which material is guided by a platform hopper and which serves to convey to the receiving hopper material which is delivered through the grating at points which do not register with the latter.

Over this grating operates an articulated unloading vehicle, the platform being sufficiently elongated to prevent the vehicle to be retracted to a position parallel to the car track. The vehicle has driving and steering wheels or tracks at both ends, these being under the control of separate operators to cause the forward end of the vehicle to move over the lateral extension of the platform into the car and, followed by the rest of the vehicle, to move longitudinally of the car to its remote end. At the forward end of the articulated vehicle is a bucket-type pickup elevator which takes grain from the floor of the car and discharges the grain onto the first of a number of articulated conveyor sections mounted on the respective sections of the articulated vehicle and arranged to deliver the grain from one to another across the point of articulation until the grain is discharged downwardly at the rear of the vehicle. The length of the articulated vehicle is such that, properly manipulated, the rear of the vehicle will always remain over a portion of the grating through which the grain will either be discharged directly into the ground hopper or onto the conveyor which underlies portions of the grating and leads to such hopper.

In the drawings:

Fig. 5 is a view in side elevation of the forward portion of the enclosed vehicle.

Fig. 8 is a fragmentary detail view in axial section through the driving connections to the track showing the brake used in steering.

Fig. 9 is a view in perspective showing the loading vehicle in operation, the freight car being broken away and the platform diagrammatically illustrated at the outside of the car, and the vehicle being a slightly modified embodiment in that its tractor portion has wheels instead of endless tracks.

Fig. 10 is a detail view in perspective showing the tractor portion of the unloading vehicle.

Fig. 11 is a detail view in front elevation of the tractor portion showing the bucket elevator.

Figures 1, 2:
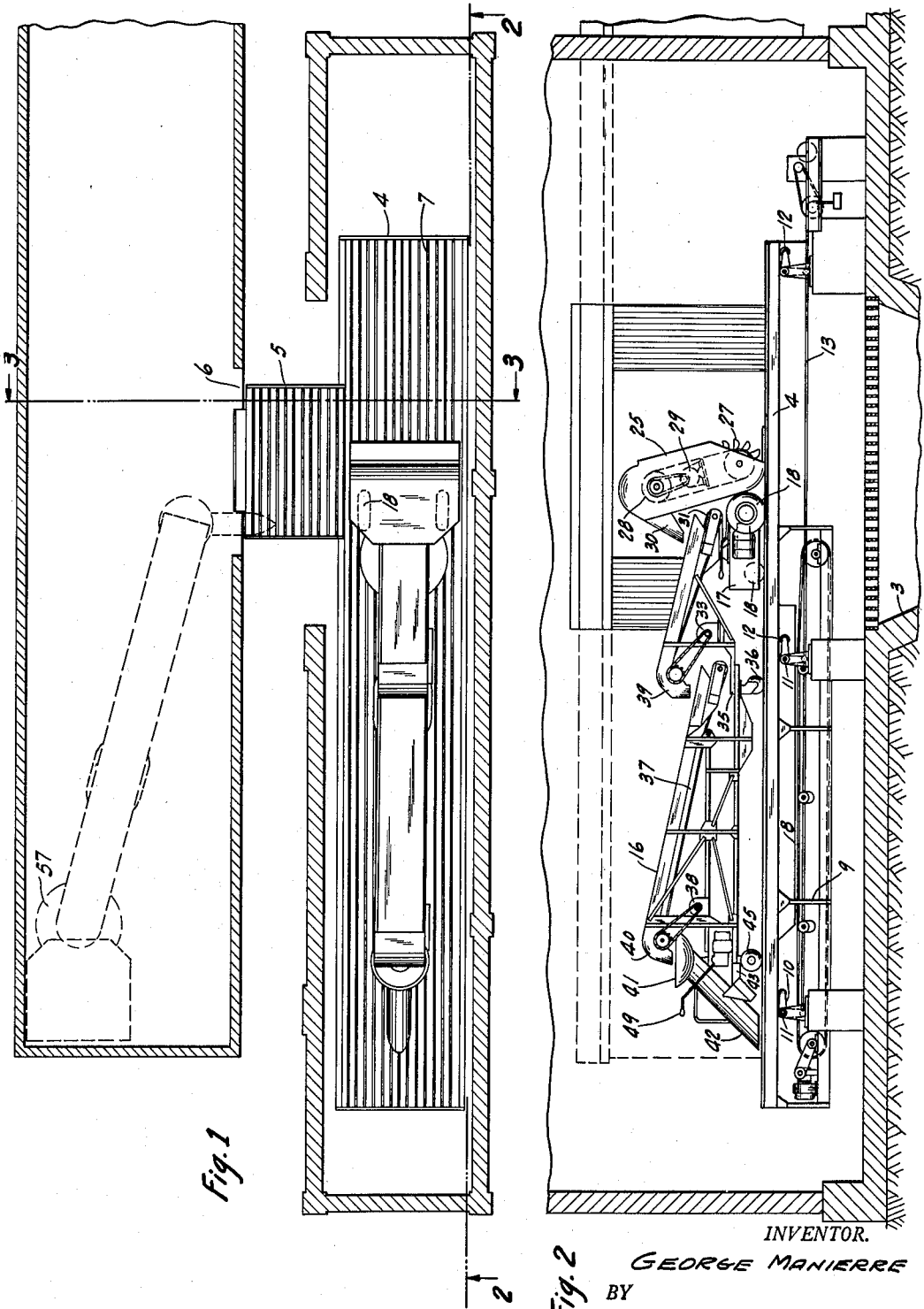
Fig. 1 is a plan view of the platform and a horizontal section through the adjacent freight car at floor level, the articulated vehicle being shown in full lines within the freight car and in dotted lines in its position upon the platform.
Fig. 2 is a view taken in section on line 2—2 of Fig. 1.
Figure 6:
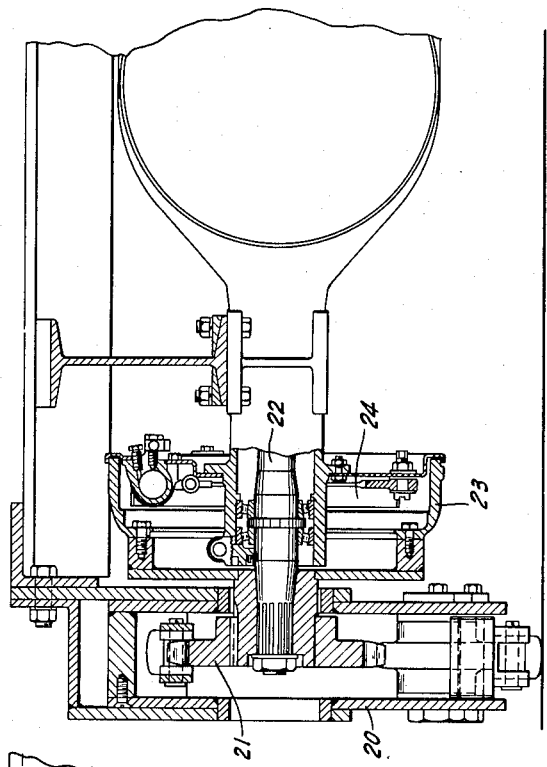
Fig. 6 is a plan view of the part shown in Fig. 5.

Adjacent the track 1 upon which the freight car 2 is supported in unloading position, there is a hopper 3 disposed in the ground in accordance with conventional practice into which the grain or other contents of the car are to be dumped.

Overlying a portion of the hopper, I provide a platform 4 having a lateral extension 5 which registers with the door opening 6 of the freight car and is raised and lowered like a draw bridge so that it will not interfere with freight car movement. The platform 4 and extension 5 are surfaced with grating 7 upon which men may walk and the unloading vehicle may operate, but through which material to be unloaded will readily fall. Since, for the purpose of the present invention, the platform 4 extends for a substantial distance parallel to the track, in order to accommodate the entire length of the unloading vehicle, I provide beneath the platform a conveyor 8 carried by sub-frame 9 from the platform and arranged to discharge toward and into the hopper 3 to carry to the hopper any material dumped through the grating 7 at points which are not over the hopper. In view of the length of the articulated unloading vehicle hereinafter to be described, it is necessary to maintain the platform 4 level and to align it with the level of the freight car. This is conveniently accomplished by the provision of bell cranks 10 which are pivoted on supports 11 at intervals throughout the length of the platform. The generally horizontal arms of the bell cranks have rollers 12 bearing against the platform frame and the several bell cranks are connected by link 13 which is hydraulically operated to oscillate all of the bell cranks simultaneously for raising and lowering the platform to make such height adjustment as is necessary.

Normally stored on the platform in the position indicated in dotted lines in Fig. 1 is the articulated unloading vehicle comprising a tractor generally designated by reference character 15 and a trailer generally designated by reference character 16.

Figure 3:
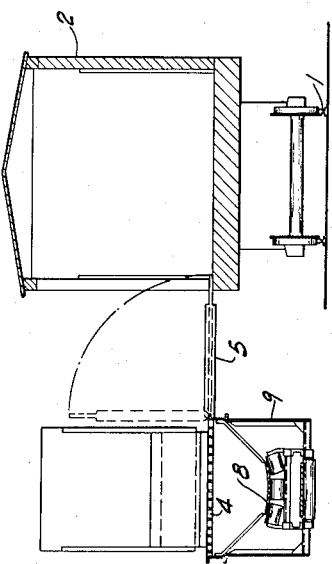
Fig. 3 is a view taken in section on line 3—3 of Fig. 1.
Figure 7:
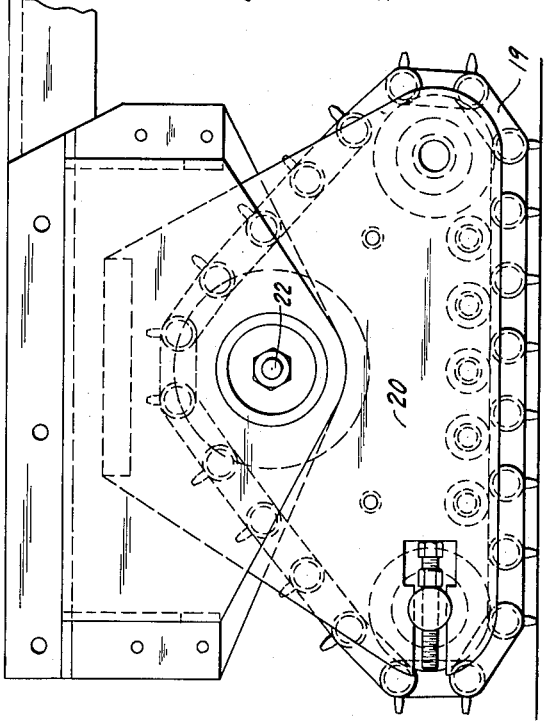
Fig. 7 is a detail view in side elevation of the supporting, propelling and steering track at the front of the forward section of the vehicle.
Figure 12:
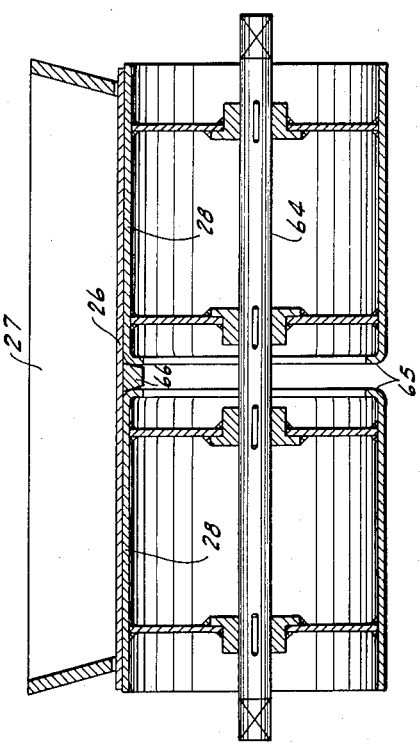
Fig. 12 is a detail in cross section of the elevator.
Figure 4:
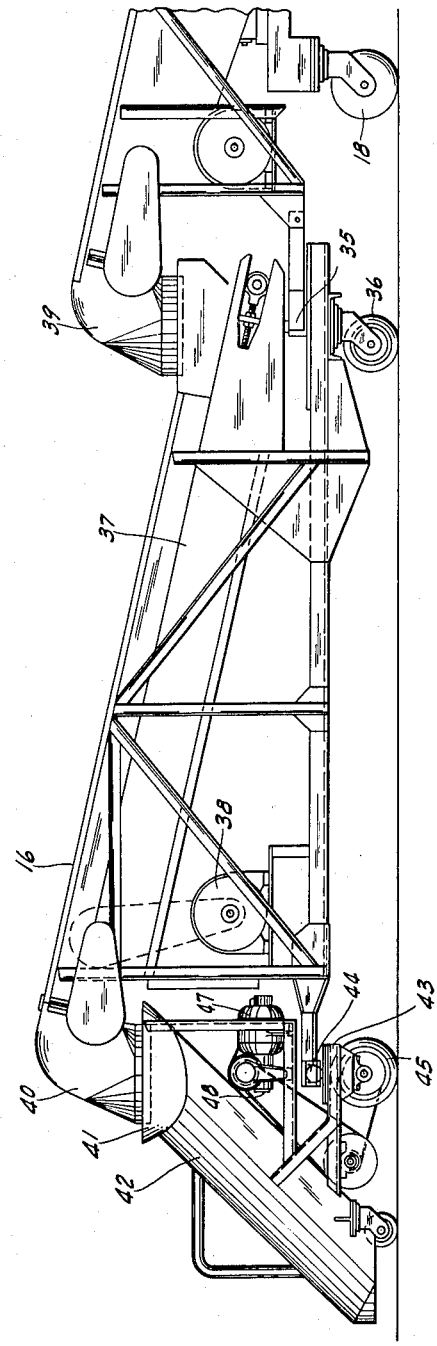
Fig. 4 is a view in side elevation of the rear portion of the enclosed vehicle.

The tractor comprises a truck 17, the front of which, as illustrated in Fig. 9, is supported by wheels 18 (Figs. 1, 2 and 3) and, as illustrated in the other views, is supported by endless tracks 19 operating over suitable pulleys in sub-frames 20 and driven by sprockets 21 from power driven axle shaft 22, the latter being provided with a brake drum at 23 and brake shoe at 24. Caster wheels 18' are used in both devices.

Mounted on the tractor 15 to depend ahead of the truck 17 is a bucket elevator 25 comprising belt means 26 upon which the conveyor buckets 27 are mounted. The upper pulley 28 over which the belt means is trained is driven by an electric motor at 29. The divided pulley 28 is on the same shaft 64 as a grooved pulley 65 which engages a V-belt 66 centrally fastened to the belt means 26. This anchors the elevator conveyor belt and bucket assembly against lateral displacement.

The elevator is inclined rearwardly as well as upwardly and discharges through hopper 30 onto a conveyor 31 mounted in a sub-frame 32 and driven by motor 33. The sub-frame 32 is pivoted universally at 34 to the truck 17 and is pivotally connected at 35 to the front end of trailer section 16 of the vehicle, such front end being supported by a caster wheel at 36. The sub-frame 32, although not independently wheel-supported, constitutes an intermediate section of the articulated vehicle and provides the only connection between the tractor and the trailer.

Mounted on the trailer 16 is a conveyor section 37 independently driven by its own motor at 38. At its forward end, it underlies the discharge portion 39 of conveyor 31. At its rear end, it is provided with a discharge portion 40 which overlies the receiving belt 41 of a hopper at 42 which is pivoted at 43 to the rear end of the trailer 16. The vertical axis of the pivotal connection at 43 permits the hopper to be swung from side to side so that it may discharge laterally through the grate 7 of the platform extension 5 when the vehicle is in the position shown in Fig. 1, or it may discharge longitudinally through the grating 7 of platform 4 any grain remaining on the vehicle conveyors when the vehicle is in the position shown in dotted lines in Fig. 1. Fig. 9 shows an intermediate position of the discharge spout. In Fig. 11, in which the car has just entered the car, the spout 42 will still be discharging through the platform 4 onto its underlying conveyor 8, the latter delivering the grain into hopper 3. It will be noted that the rear of the trailer frame is supported by a separate truck 43 upon which the frame is pivoted at 44 for steering movement. The spout and truck 43 turn as a unit.

The wheels or other steering and driving supports at 45 for the rear end of the trailer portion 16 of the articulated vehicle are independently driven by the motor 17 subject to the clutch and gearing (not shown) in housing 48 and controls therefor at 49 within reach of the operator 50 at the rear end of the vehicle. The station for the rear operator 50 is preferably such that he controls the driving and steering of the rear truck as he stands or walks at the rear of the vehicle.

A station for the forward operator 51 comprises a platform 52 (Fig. 9) or seat 53 (Fig. 10) on the housing of conveyor 31 upon which he may ride. Thus he does not ride directly on the tractor but upon the trailer or the intermediate section in the preferred embodiment here illustrated. The controls for the tractor portion of the vehicle are mounted on the panel 54 (Fig. 10) and include means for controlling the operation and the rate of operation of the propelling motor 55 (Fig. 5) and the brakes which are hydraulically operated to control steering.

There is also a hydraulically operable tooth 56 which meshes with one of the teeth of segment 57 and is actuated by a ram to effect relative pivotal movement between the tractor 15 and the intermediate conveyor section to assist in the articulation of the vehicle where a short turn is to be negotiated or when the sections are on center. Power is supplied to the various motors through a cable 60 which is trained over a sheave 61 carried by a counterweighted support 62 (Fig. 10).

With the vehicle in its normally retracted position, it is disposed longitudinally of platform 4 and substantially parallel to track 1. (The platform may be disposed between parallel tracks and arranged to unload cars at either side of the platform.) When the car is brought alongside the platform and spotted over the hopper 3, its door 6 will register with platform extension 5 in longitudinal direction and the platform will then be raised or lowered to register with the car floor in a vertical direction.

Thereupon the forward operator 51 of the unloading vehicle and the rearward operator 50 thereof will start the propelling motors at the front and rear of the unloading vehicle and will guide its articulated sections by driving and steering the front of the tractor and the rear of the trailer to manipulate the vehicle into the car, progressively removing grain therefrom.

At the outset, the discharge spout 42 at the rear end of the unloading vehicle will remain over that portion of the grating beneath which conveyor 8 operates. As the unloading vehicle moves into one end of the car, the spout will reach the position shown in Fig. 9 and, finally, the position shown in Fig. 1 (if the car is long). When one end of the car is unloaded, the vehicle is backed out onto the platform and then advanced onto the opposite end of the car. It will remove substantially all of the grain, leaving only a relatively small amount to be taken out by other methods.

I claim:

1. In a device for unloading grain and the like from a freight car into a hopper disposed at a lower level adjacent the track, a platform disposed adjacent the track and having a platform surface comprising a grating beside the track and adapted for the operation of a vehicle thereover and for the discharge of grain and the like therethrough, means for delivering into said hopper material passing through the grating, and an articulated vehicle for which said platform is sufficiently long to provide accommodation, said articulated vehicle comprising at its forward end a pickup device and having conveyor means extending longitudinally of the vehicle and discharging downwardly at the rear end of the vehicle, said vehicle articulation being adapted to permit it to be manipulated over said platform from a position of retraction in which the vehicle is on the platform to an extended position in which the forward end of the vehicle enters and moves longitudinally of the freight car, material picked up by the pickup device being dumped through said grating in all operative positions of the vehicle in which the forward end thereof is in the car.

2. The device of claim 1 in which the vehicle has a pickup device at its forward end and a discharge means at its rear end, said vehicle comprising pivotally connected front, rear and intermediate sections, dirigible driving and supporting means for the front and rear sections of the vehicle, and independent controls for said means at the front and rear sections respectively whereby the several sections may be manipulated to enter a central car door and move longitudinally of the car to the end thereof.

3. The device of claim 1 in which the vehicle has a pickup device at its forward end and a discharge means at its rear end, said vehicle comprising pivotally connected front, rear and intermediate sections, dirigible driving and supporting means for front and rear sections of the vehicle, and independent controls for the said means, the control for the said means of one such last named section being located on an intermediate section of the vehicle.

References Cited in the file of this patent

UNITED STATES PATENTS

| | | |
|---|---|---|
| 1,021,463 | Jackson | Mar. 26, 1912 |
| 1,313,218 | Jackson | Aug. 12, 1919 |
| 1,446,303 | Hill | Feb. 20, 1923 |
| 1,473,815 | Francke | Nov. 13, 1923 |
| 1,600,383 | Ahlskog | Sept. 21, 1926 |
| 1,809,662 | Alger | June 9, 1931 |
| 1,821,536 | Barber | Sept. 1, 1931 |
| 2,083,857 | Neighbour | June 15, 1937 |
| 2,219,926 | Jessen | Oct. 29, 1940 |
| 2,346,659 | Bruce | Apr. 18, 1944 |
| 2,420,009 | Osgood | May 6, 1947 |
| 2,608,311 | Findlay | Aug. 26, 1952 |
| 2,613,003 | Buck | Oct. 7, 1952 |
| 2,674,364 | Cartlidge | Apr. 6, 1954 |